March 13, 1934.   N. W. RACE   1,950,567
FRONT DRIVE
Filed April 14, 1932   4 Sheets-Sheet 1
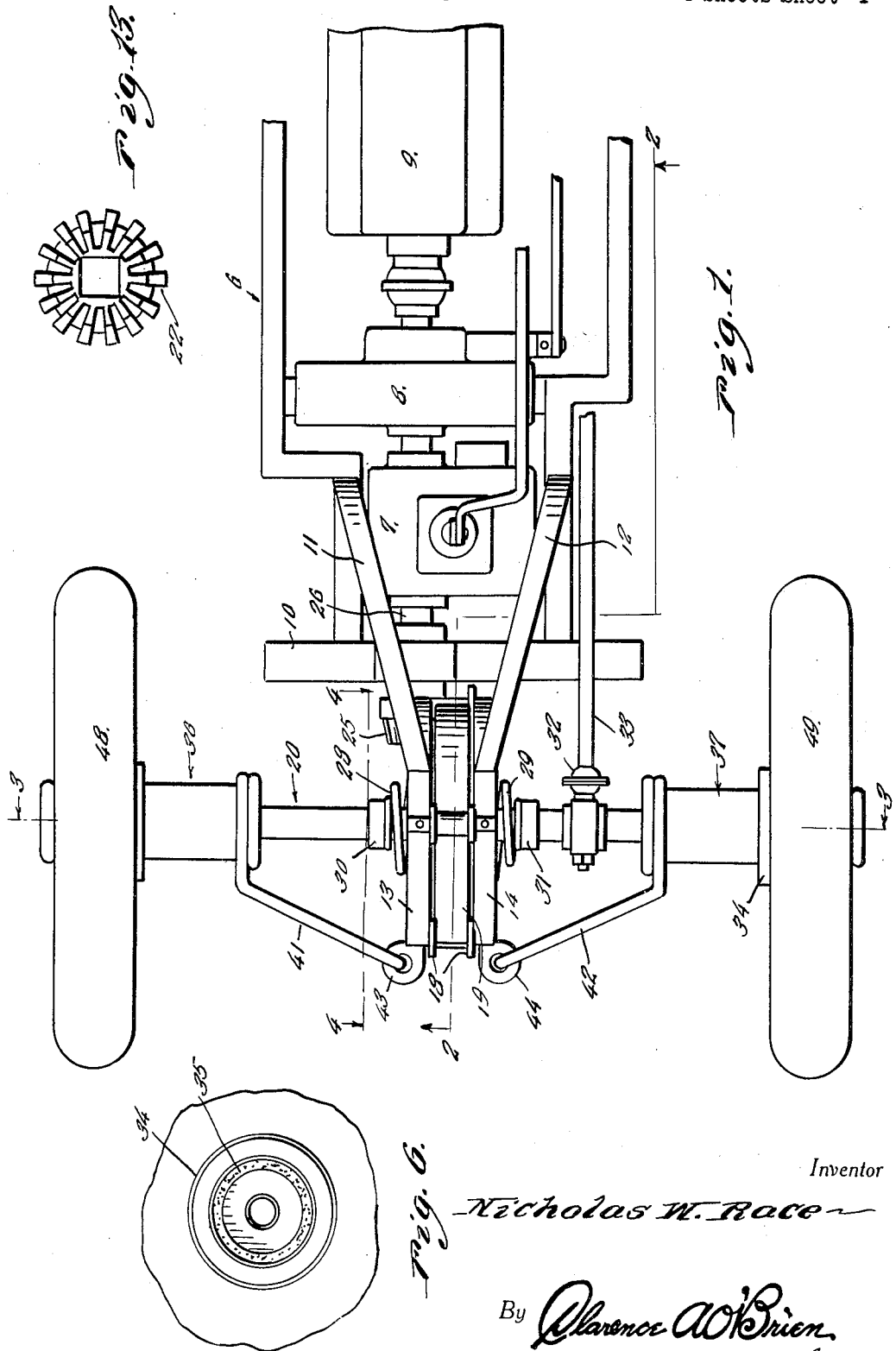
Inventor
Nicholas W. Race
By Clarence A. O'Brien
Attorney March 13, 1934.　　　N. W. RACE　　　1,950,567
FRONT DRIVE
Filed April 14, 1932　　　4 Sheets-Sheet 2
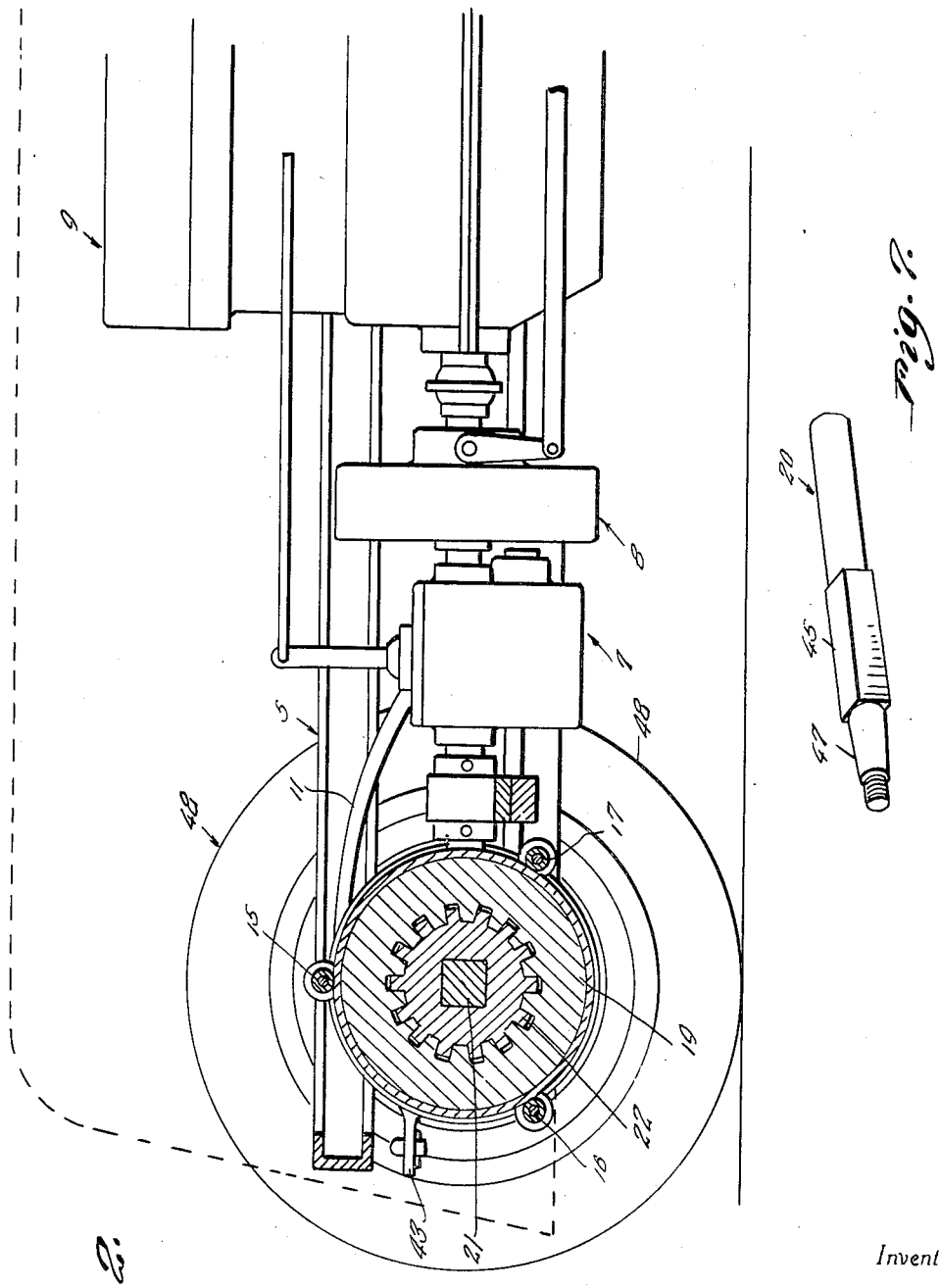
Inventor
Nicholas W. Race
By Clarence A. O'Brien
Attorney

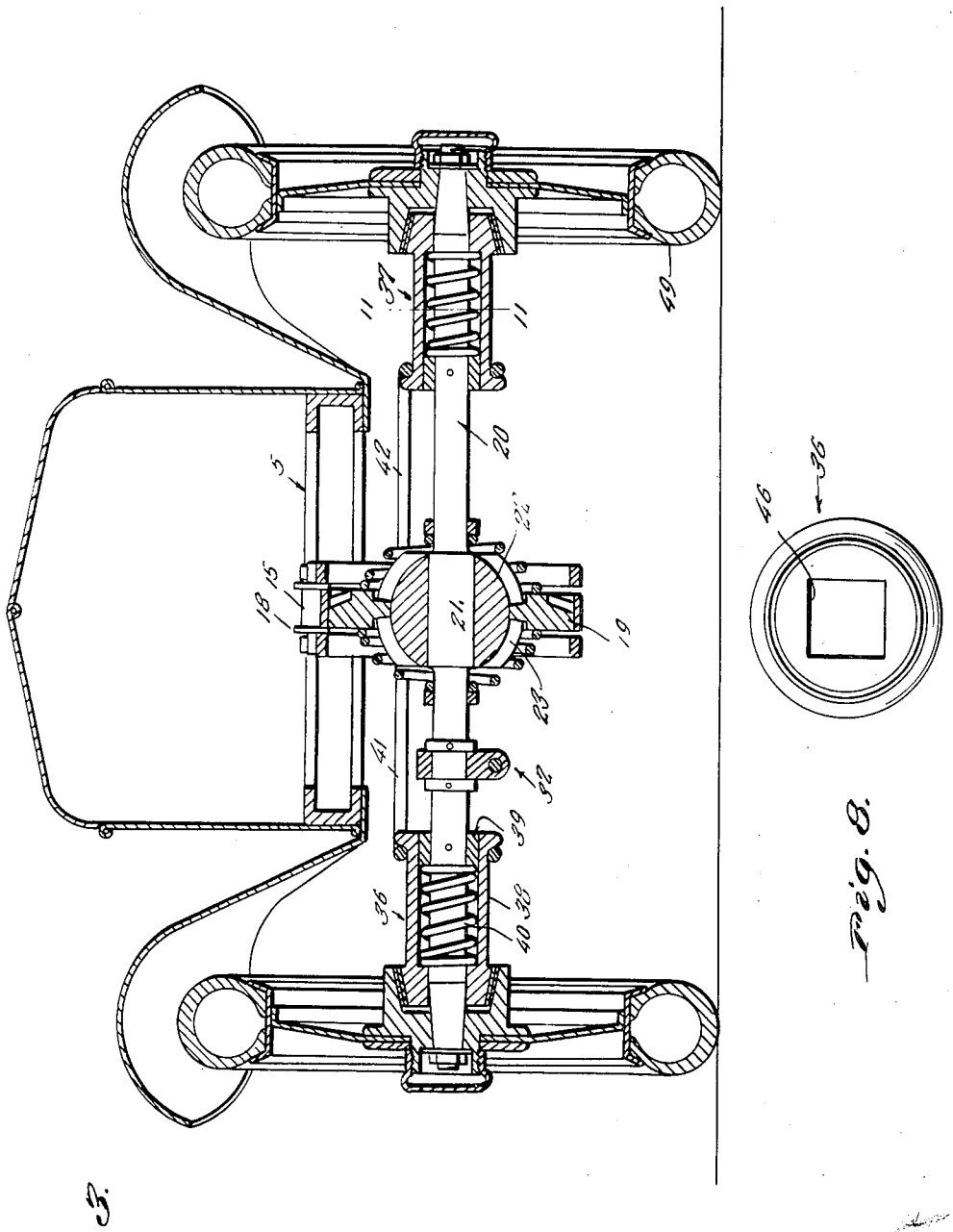

March 13, 1934.  N. W. RACE  1,950,567
FRONT DRIVE
Filed April 14, 1932  4 Sheets-Sheet 4
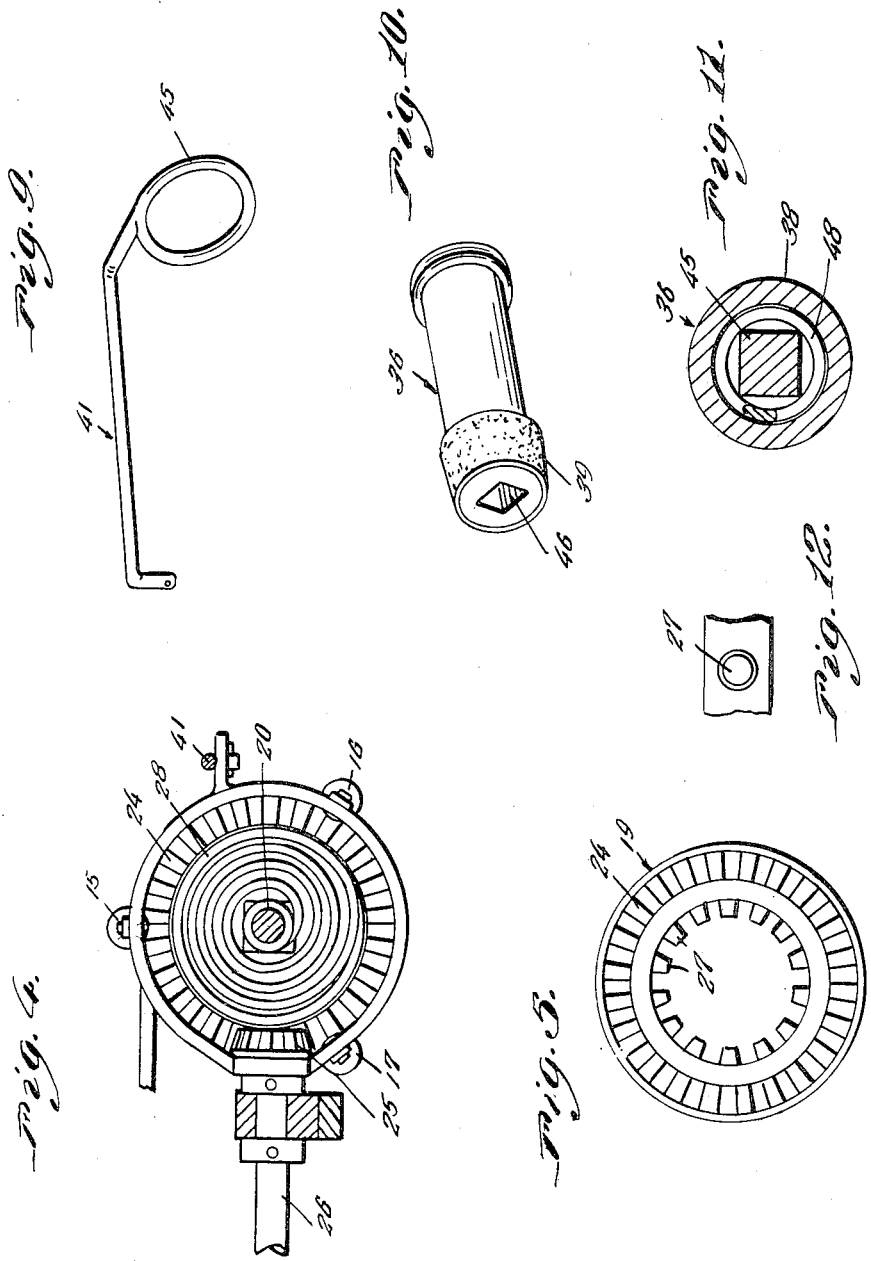
Inventor
Nicholas W. Race
By Clarence A. O'Brien
Attorney Patented Mar. 13, 1934

1,950,567

UNITED STATES PATENT OFFICE 1,950,567

FRONT DRIVE

Nicholas W. Race, Roberts, Mont.

Application April 14, 1932, Serial No. 605,326

2 Claims. (Cl. 180—42)

My invention relates to improvements in front drive mechanisms for motor vehicles.

It is an important object of my invention to provide a front drive mechanism which is considerably simpler in construction and costs less to manufacture than other successful front drive mechanisms.

It is also an important object of my invention to provide a front drive mechanism which comprises as a unit the front drive, the motor, and the transmission of the motor vehicle, carried separate from the chassis of the motor vehicle.

It is also an important object of my invention to provide new and novel mechanism movements in front drive mechanisms, whereby to promote traction, greater control, ease of handling and riding ease, as well as lower the center of gravity of such mechanisms.

Other objects and advantages of my invention will be apparent from a reading of the following description in connection with the drawings, wherein for purposes of illustration I have shown a preferred embodiment of the invention.

Figure 1 is a top plan view of the embodiment.

Figure 2 is a side elevational view partly in longitudinal vertical section on the line 2—2 of Figure 1.

Figure 3 is a transverse vertical sectional view through Figure 1 looking in the direction of the arrows approximately on the line 3—3.

Figure 4 is a sectional view taken approximately on the line 4—4 of Figure 1.

Figure 5 is a side elevational view of the idler wheel.

Figure 6 is a view of part of one of the front wheels showing the clutch facing element thereof.

Figure 7 is a view in the perspective view of one end of the front axle.

Figure 8 is an end view of one of the clutch members adapted to cooperate with a front wheel.

Figure 9 is a perspective view of one of the wheel clutch controls.

Figure 10 is a perspective view of one of the movable wheel clutch elements.

Figure 11 is a transverse vertical sectional view through Figure 10.

Figure 12 is a detail view of one of the idler wheel teeth.

Figure 13 is an end view of the spherical bull wheel.

Referring in detail to the drawings, wherein like numerals refer to like parts throughout the same, the numeral 5 generally designates a conventional chassis frame of an automobile or other motor vehicle, the numeral 6 refers generally to the separate frame of the device of the invention carrying the front axle drive, the transmission 7, the clutch 8, and the motor 9, in this order from front to rear, and suitably connected to the chassis by flexible means whereby transmission of vibration and twisting and tramp to the chassis is to a great extent eliminated.

On the auxiliary frame 6 is the front cross member 10 over which upwardly and forwardly directed arms 11 and 12 extend to circular or annular frames 13 and 14 which carry between them rollers or spools 15, 16, 17 which are provided with the flanges 18 for confining therewithin a freely mounted idler wheel 19 which is circumposed about the one piece front axle 20. The annular frames 13 and 14 are likewise circumposed with respect to the front axle 20.

The front axle has an enlarged squared central portion 21 upon which is mounted a spherical bull wheel 22 which has transverse arcuate grooves 23 constituting circumferential teeth adapted to be in constant mesh with teeth carried by the idler wheel 19 in the various, and constantly changing positions of the front axle in service. Reference to Figure 5 discloses in detail the construction of the idler wheel 13. It will be observed that it is annular in form and provided marginally at one lateral face with circumferentially arranged teeth 24 with which there is engaged a pinion 25 carried by a short shaft 26 connected to the transmission 7. Teeth 27 are carried by the inward edges of the idler wheel in circumferentially spaced relationship, and these teeth 27 are to be in constant mesh with the arcuate grooves or teeth 23 of the bull wheel 22. The arrangement of the bull wheel with a squared opening receiving the enlarged squared portion 21 of the axle permits easily floating the bull wheel therefrom when repairs or disassembling for any purpose is to be undertaken.

Means for maintaining the position of the idler wheel 19 in the various, changing positions of the front axle, and while the vehicle is being steered comprises a spring 28 and a spring 29. Each of these springs is circumposed upon the axle and is of the expanding spiral type or any other suitable type provided to engage the opposite sides of the idler wheel and to be retained in position upon the axle by suitable retaining collars 30 and 31 carried by the axle. Means for steering the axle comprises a suitable universal connection 32 and a steering rod 33.

Means for giving a differential action to the front wheels is provided in the arrangement of the inward portion of the hubs 34 wherein a suitably flared clutch face 35 is provided, to be operatively cooperated with by movable clutch elements 36 and 37 which slide upon the axle 20.

The movable members 36, 37 each comprise a tubular body portion 38 having at one end a suitably tapered circular portion having the friction face 39 for engagement with the clutch facing 35 of the front wheels. A stationary block 39 secured upon the axle anchors an interior coiled spring 40 within the tubular body portion 38 whereby the movable members 36, 37 are normally projected into operative engagement with the wheels to be thereby rotated by rotation of the axle 20 as the power of the motor is applied thereto. It will be observed that I do not toe-in the front wheels, but have them arranged at right angles to the axle whereby to secure the maximum traction and other advantages.

Means for automatically withdrawing the movable elements 36, 37 out of full operative engagement with the front wheels, to enable the said differential action, comprises free levers 41, 42 pivotally mounted as at 43, and 44 on the forward ends of the annular frames 13, 14 and connected by a suitable fork or ring formation 45 with the movable members 36, 37, so that the levers 41, 42 may draw and move these movable members while not affecting the free rotation thereof.

It will be observed in Figures 7 and 8 that the end portion of the axles upon which the slidable members 36, 37 are mounted are provided with enlarged squared portions 45 through square bores 46 in the movable members. This construction provides for positive action and easy removal. As seen at 47 the ends of the axle are rounded and tapered for mounting the wheels 48 and 49 thereon.

It will be recognized that with the structure described above there is obtained remarkable flexibility of the front axle assembly. This is not only due to the small number of parts involved, but also to the simplicity and direct action of the parts relative to one another. The principle of providing the motor, the clutch, the transmission and the front drive to be carried by the frame separate from the chassis frame, likewise provides for flexibility and absence of transmission of road shock and vibration to the chassis.

Though I have shown and described herein a preferred embodiment of the invention, it is to be definitely understood that I do not desire to limit the application of the invention thereto, and any change or changes may be made in materials, and in the structure and arrangement of parts, within the spirit of the invention and the scope of the subjoined claims.

What is claimed is:—

1. In a vehicle front drive having a rotatable axle, a globular member connected to rotate with and surrounding the center of the axle and provided with circumferential grooves located in planes which pass through the axis of the globular member, a frame surrounding the globular member and the axle, an annular member rotatably carried by the frame and surrounding the globular member, teeth on the inner periphery of the annular member slidably engaged in the grooves of the globular member, and drive means operatively connected to the annular member for rotating the same and driving the axle.

2. In a vehicle front drive having a rotatable axle, a globular member connected to rotate with and surrounding the center of the axle and provided with circumferential grooves located in planes which pass through the axis of the globular member, a frame surrounding the globular member and the axle, an annular member rotatably carried by the frame and surrounding the globular member, teeth on the inner periphery of the annular member slidably engaged in the grooves of the globular member, and drive means operatively connected to the annular member for rotating the same and driving the axle, and spring means at each side of the annular member and acting between the axle and the opposite sides of the annular member to urge the axle toward normally horizontal, right angular relationship to the annular member.

NICHOLAS W. RACE.